United States Patent
Faber et al.

(10) Patent No.: US 10,883,773 B2
(45) Date of Patent: Jan. 5, 2021

(54) HEAT EXCHANGER WITH A SEPARATOR

(71) Applicant: Mahle International GmbH, Stuttgart (DE)

(72) Inventors: Christian Faber, Stuttgart (DE); Simon Hund, Stuttgart (DE); Bernd Kraemer, Schwieberdingen (DE); Albrecht Siegel, Ludwigsburg (DE)

(73) Assignee: Mahle International GmbH

(*) Notice: Subject to any disclaimer, the term of this patent is extended or adjusted under 35 U.S.C. 154(b) by 127 days.

(21) Appl. No.: 15/981,887

(22) Filed: May 16, 2018

(65) Prior Publication Data

US 2018/0335263 A1 Nov. 22, 2018

(30) Foreign Application Priority Data

May 17, 2017 (DE) .................. 10 2017 208 324

(51) Int. Cl.
*F28D 21/00* (2006.01)
*F28F 9/00* (2006.01)
(Continued)

(52) U.S. Cl.
CPC ....... *F28D 21/0003* (2013.01); *F28D 7/1684* (2013.01); *F28F 9/001* (2013.01);
(Continued)

(58) Field of Classification Search
CPC .... F28D 21/0003; F28D 7/1684; F28F 9/001; F28F 9/005; F28F 9/22; F28F 9/0131;
(Continued)

(56) References Cited

U.S. PATENT DOCUMENTS 2,200,787 A * 5/1940 Coy ......................... F28F 9/22
  165/176
2,419,233 A * 4/1947 Spender ................. F28F 1/105
  165/128
(Continued)

FOREIGN PATENT DOCUMENTS

DE 102006051000 A1 7/2007
DE 102012211311 A1 1/2014
(Continued)

OTHER PUBLICATIONS

English abstract for EP-2559962.
English abstract for DE-102006051000.

*Primary Examiner* — Travis C Ruby
(74) *Attorney, Agent, or Firm* — Fishman Stewart PLLC

(57) ABSTRACT

A heat exchanger may include a tubular housing, a flange ring, two bases, and heat exchanger tubes running through the housing and respectively held at a longitudinal end side in the bases, a first flow channel formed therein, and a second flow channel formed between the tubes and the housing. The housing may be formed from first and second housing parts each being pot-shaped and having a housing portion, an outwardly widened flange ring portion, and a base. The housing parts may be connected to one another via the flange ring portions that may delimit an annular space. On the first housing part, inlet and outlet connecting-pieces for coolant may be provided. Between the housing and the heat exchanger tubes, at least one separator may be arranged, on which at least one blade may be provided, the blade engaging at least partly into the annular space and at least reducing a circumferential flow therein.

18 Claims, 3 Drawing Sheets

(51) Int. Cl.
  *F28F 9/22* (2006.01)
  *F28D 7/16* (2006.01)
  *F02G 5/02* (2006.01)
  *F28F 1/40* (2006.01)

(52) U.S. Cl.
  CPC ............... *F28F 9/005* (2013.01); *F28F 9/22* (2013.01); *F02G 5/02* (2013.01); *F28F 1/40* (2013.01)

(58) Field of Classification Search
  CPC ...... F28F 1/40; F28F 1/128; F28F 1/14; F28F 1/22; F28F 1/325; F28F 2009/222; F28F 2009/224; F28F 2009/226; F02G 5/02
  See application file for complete search history.

(56) References Cited

U.S. PATENT DOCUMENTS

| | | | | |
|---|---|---|---|---|
| 2,574,142 A * | 11/1951 | Buongirno | F28F 1/30 | 165/77 |
| 3,001,767 A * | 9/1961 | Straubing | F28D 7/106 | 165/154 |
| 3,016,893 A * | 1/1962 | Brown, Jr. | F28D 7/10 | 126/116 R |
| 3,074,480 A * | 1/1963 | Brown, Jr. | F28D 7/10 | 165/154 |
| 3,400,758 A * | 9/1968 | Lee | F28F 9/22 | 165/159 |
| 3,532,160 A * | 10/1970 | Garrison | F28F 9/0265 | 165/159 |
| 4,305,453 A * | 12/1981 | Wagner | F28F 9/0131 | 165/162 |
| 4,382,467 A * | 5/1983 | Garrison | F28D 7/1638 | 122/510 |
| 4,415,024 A * | 11/1983 | Baker | F28D 7/1661 | 165/111 |
| 4,548,260 A * | 10/1985 | Stachura | F28D 7/1646 | 165/160 |
| 4,561,498 A * | 12/1985 | Nowobilski | F28F 9/22 | 165/160 |
| 4,852,368 A * | 8/1989 | Bravo | A23G 9/222 | 62/515 |
| 4,924,938 A * | 5/1990 | Plaschkes | F28F 9/00 | 165/145 |
| 5,738,168 A * | 4/1998 | Patel | F28F 1/325 | 165/151 |
| 6,009,936 A * | 1/2000 | Kubota | F28F 1/12 | 165/181 |
| 6,595,275 B1 * | 7/2003 | Wang | F28F 3/02 | 165/185 |
| 7,007,504 B2 * | 3/2006 | Kang | F25B 39/04 | 62/507 |
| 7,543,471 B2 * | 6/2009 | Birkert | B21D 17/025 | 165/160 |
| 8,640,490 B2 * | 2/2014 | Cossenet | F25B 37/00 | 62/484 |
| 2002/0144801 A1 * | 10/2002 | Gokan | F02B 29/0462 | 165/51 |
| 2004/0206484 A1 * | 10/2004 | Shimoya | F28D 1/05383 | 165/152 |
| 2006/0016582 A1 * | 1/2006 | Hashimoto | F28D 7/1684 | 165/109.1 |
| 2007/0012430 A1 * | 1/2007 | Duke | F28F 1/128 | 165/109.1 |
| 2007/0107885 A1 * | 5/2007 | Guillaume | F28D 7/16 | 165/158 |
| 2007/0235173 A1 * | 10/2007 | Chen | F25B 39/02 | 165/159 |
| 2008/0169093 A1 * | 7/2008 | Ohfune | F28D 7/1684 | 165/164 |
| 2008/0179049 A1 * | 7/2008 | Mathur | F28D 9/0012 | 165/159 |
| 2008/0190589 A1 * | 8/2008 | Kramer | F28F 1/128 | 165/152 |
| 2008/0202724 A1 * | 8/2008 | Lorenz | F28D 7/0075 | 165/51 |
| 2008/0289804 A1 * | 11/2008 | Baumann | F28D 7/1692 | 165/157 |
| 2009/0013678 A1 * | 1/2009 | Capelle | F28D 7/06 | 60/320 |
| 2009/0090497 A1 * | 4/2009 | Knaus | B21D 53/02 | 165/182 |
| 2010/0193172 A1 * | 8/2010 | Knaus | F28F 1/128 | 165/185 |
| 2010/0230085 A1 * | 9/2010 | Feng | B21D 53/04 | 165/185 |
| 2010/0243224 A1 * | 9/2010 | Jianlong | F28F 1/128 | 165/173 |
| 2012/0186780 A1 * | 7/2012 | Ilgner | F02B 29/045 | 165/76 |
| 2013/0186608 A1 * | 7/2013 | Liu | F28F 1/24 | 165/181 |
| 2013/0264038 A1 * | 10/2013 | Kerler | F28F 1/325 | 165/166 |
| 2014/0000848 A1 | 1/2014 | Siegel et al. | | |
| 2014/0034028 A1 * | 2/2014 | Zhang | F28F 9/02 | 123/568.12 |
| 2016/0097599 A1 * | 4/2016 | Iwasaki | F28F 3/027 | 165/175 |
| 2016/0102632 A1 | 4/2016 | Han | | |
| 2017/0336148 A1 | 11/2017 | Siegel et al. | | |

FOREIGN PATENT DOCUMENTS

| | | |
|---|---|---|
| DE | 102015102096 A1 | 4/2016 |
| DE | 102014225159 A1 | 6/2016 |
| EP | 2559962 A2 | 2/2013 |
| GB | 664304 A | 1/1952 |
| WO | 2003091650 A1 | 11/2003 |

* cited by examiner

HEAT EXCHANGER WITH A SEPARATOR

CROSS-REFERENCE TO RELATED APPLICATIONS

This application claims priority to German Patent Application No. DE 10 2017 208 324.7, filed on May 17, 2017, the contents of which are incorporated herein by reference in its entirety.

TECHNICAL FIELD

The present invention relates to a heat exchanger with a tubular housing, a flange ring, two bases and heat exchanger tubes.

BACKGROUND

From DE 10 2012 211 311 A1 a generic heat exchanger, and configured as an exhaust gas heat exchanger, is known, with a housing and with a first flow channel, which is able to be flowed through by a first fluid. The first flow channel is formed here by the heat exchanger tubes, whereas a second flow channel runs between the heat exchanger tubes and the housing. At at least one of its end regions, the heat exchanger has an at least partially circumferential first flange, which is embodied in one piece with the exhaust gas heat exchanger.

From WO 03/091 650 A1 an exhaust gas heat exchanger with an exhaust gas return is known, which has a housing casing for a coolant and a tube bundle which is flowed through by exhaust gases and is flowed around by the coolant. The tube bundle, the tube plates and the housing casing form here a force flow which is self-contained. A sliding seat, which is arranged either in the housing casing or between tube plate and housing casing, is incorporated into the force flow.

From DE 10 2006 051 000 A1 a further heat exchanger is known, with a housing which is able to be flowed through by at least a first medium and at least a second medium. Within the housing, at least one flow means, able to be flowed around by the second medium, is provided, which flow means is intended to improve a heat transfer.

A disadvantage in the heat exchangers known from the prior art are generally so-called short-circuit flows within the heat exchanger, which are responsible for the heat exchanger not being flowed through sufficiently and in particular also not uniformly, whereby on the one hand only a reduced cooling efficiency is able to be achieved, and on the other hand the risk of a tendency to boiling within the heat exchanger always exists, which significantly reduces the lifespan which is to be expected. Such short-circuit flows occur increasingly in the case of the use of rectangular heat exchanger tubes in round housings.

SUMMARY

The present invention is therefore concerned with the problem of indicating for a heat exchanger of the generic type an improved or at least an alternative embodiment, which on the one hand is designed in a structurally simple manner and which on the other hand avoids the disadvantages known from the prior art.

This problem is solved according to the invention by the subject of the independent claims. Advantageous embodiments are the subject of the dependent claims.

The present invention is based on the general idea of forming a heat exchanger in a structurally comparatively simple manner from two housing parts which are connected to one another via respective flange portions, and in addition of providing a type of flow guide element in the region of the two flange portions or respectively of an annular space delimited by the two flange portions, which prevents an undesired short-circuit flow in circumferential direction through the annular space and thereby guarantees a uniform through-flow of the heat exchanger, which enables not only an increased efficiency of the heat exchanger, but at the same time also prevents boiling regions. The heat exchanger according to the invention has here in a known manner a tubular housing, a flange ring and two bases and heat exchanger tubes, which run through the housing and are held respectively on the longitudinal end side in the bases. In the heat exchanger tubes, a first flow channel or respectively flow path and between the heat exchanger tubes and the housing a second flow channel or respectively a second flow path is formed here. According to the invention, the housing is now formed from a first and a second respectively pot-shaped housing part, of which each housing part has a housing portion, an outwardly widened flange ring portion and a base, and wherein the two housing parts are connected to one another via their respective flange ring portions, in particular are soldered to one another. The two flange ring portions delimit here an annular space lying radially at least slightly outside the housing. On the first housing part, an inlet connecting-piece and an outlet connecting-piece for coolant is provided here, which considerably simplifies an installation of the heat exchanger according to the invention into an engine compartment. Between the housing and the heat exchanger tubes, a separator is arranged on which according to the invention at least one blade is provided, which engages at least partially into the annular space and at least reduces a circumferential flow occurring there under certain circumstances, which represents an undesired short-circuit flow. The at least one blade on the at least one separator can be produced here in a comparatively simple and therefore also favourably priced manner with regard to manufacture, for example by it being simply stamped out from the material of the separator and bent around outwards. With the separator according to the invention in the heat exchanger according to the invention, it is possible in a technically simple and favourably priced manner to create a heat exchanger which is flowed through uniformly, which not only has a higher efficiency, but with which also the risk of boiling is at least minimized. The arrangement or respectively geometric configuration of the at least one blade can take place here as a function of so-called CFD calculations, by means of which flow conditions in the heat exchanger are calculated and in particular undesired boiling regions can be located.

In an advantageous further development of the solution according to the invention, the at least one blade is stamped out from the separator and shaped. This constitutes a comparatively simple and, in addition, favourably priced manufacturing method of the at least one blade, because essentially a forming tool which was used hitherto for the production of the separator can continue to be used, in which only a stamping- or respectively forming die has to be implemented. Of course, it is also conceivable that the separator is produced as usual with the forming tool, for example a deep-drawing tool, and the at least one blade is stamped out and shaped in a further working step. Purely theoretically, of course, a subsequent arranging of such a blade is also conceivable. The hole occurring in the separator during the stamping out and shaping of the at least one blade brings about only a marginal alteration of flow and can, moreover, be utilized in a targeted manner in order to direct coolant, flowing through the hole, to particular locations. Here also, by means of an aligning or respectively stamping out of the at least one blade, namely in front of the hole or respectively thereafter, viewed in the direction of flow, the further through-flow of the heat exchanger with coolant can be influenced.

In a further advantageous embodiment of the solution according to the invention, an external geometry of the at least one blade is configured in a complementary manner to an internal geometry of the annular space. In this case, the blade therefore closes the annular space delimited by the two flange portions of the two housing parts and thereby preferably completely prevents a circumferential flow and hence also an undesired short-circuit flow in this region. Of course, it is also conceivable here that the at least one blade is configured to be shorter in radial direction than the annular space, whereby a defined circumferential flow, for example to a next blade, viewed in circumferential direction, is still made possible. Basically, it is conceivable here that also two or more blades having identical or different radial height are provided, whereby an entirely targeted flow of the coolant can be achieved.

Expediently, the separator has at least one injector opening and/or at least one NACA opening. Such an injector opening can bring about for example a targeted incident flow of individual heat exchanger tubes, while a so-called NACA opening constitutes a fluid inlet in the separator which is favoured with regard to flow and produces a targeted coolant jet. Such NACA openings (National Advisory Committee for Aeronautics) generate, through the oblique edges, air vortexes which displace the slow boundary layer flow and thereby bring about little resistance fluidically.

Expediently, the flange ring portion of the one housing part has an external diameter which is configured in a complementary manner to an internal diameter of the flange ring portion of the other housing part and is thereby able to be inserted into the latter. An assembling of the housing of the heat exchanger can therefore take place by a simple connecting or respectively joining, in particular soldering, welding, of the two housing parts in the region of the respective flange ring portions. Usually here, with a soldering, welding or generally joining of the two housing parts at the same time also the heat exchanger tubes, which are inserted and caught in the two bases, are also soldered, welded or respectively joined, whereby a high-quality, quick and, at the same time, favourably priced production is made possible.

In a further advantageous embodiment of the solution according to the invention, the heat exchanger is configured as an exhaust gas heat exchanger.

Exhaust gas heat exchangers can be used for example for heating the coolant and thereby also for a reduction of the emissions-intensive cold start phase of an internal combustion engine, wherein in addition with an exhaust gas return also exhaust gas which is to be returned can be cooled by means of the exhaust gas heat exchanger. Such an exhaust gas return partly lowers the emissions of the internal combustion engine considerably.

Expediently, at least one of the housing parts is configured as a shaped sheet metal stamped part and in particular is produced by deep-drawing. In addition to avoiding the joint sites, the individual housing parts are of course also to be able to be produced at a high quality and at a favourable cost, which can be achieved in particular in that these are produced as shaped sheet metal stamped parts. The pot-shaped configuration of the respective housing part can be achieved here in particular by a deep-drawing.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
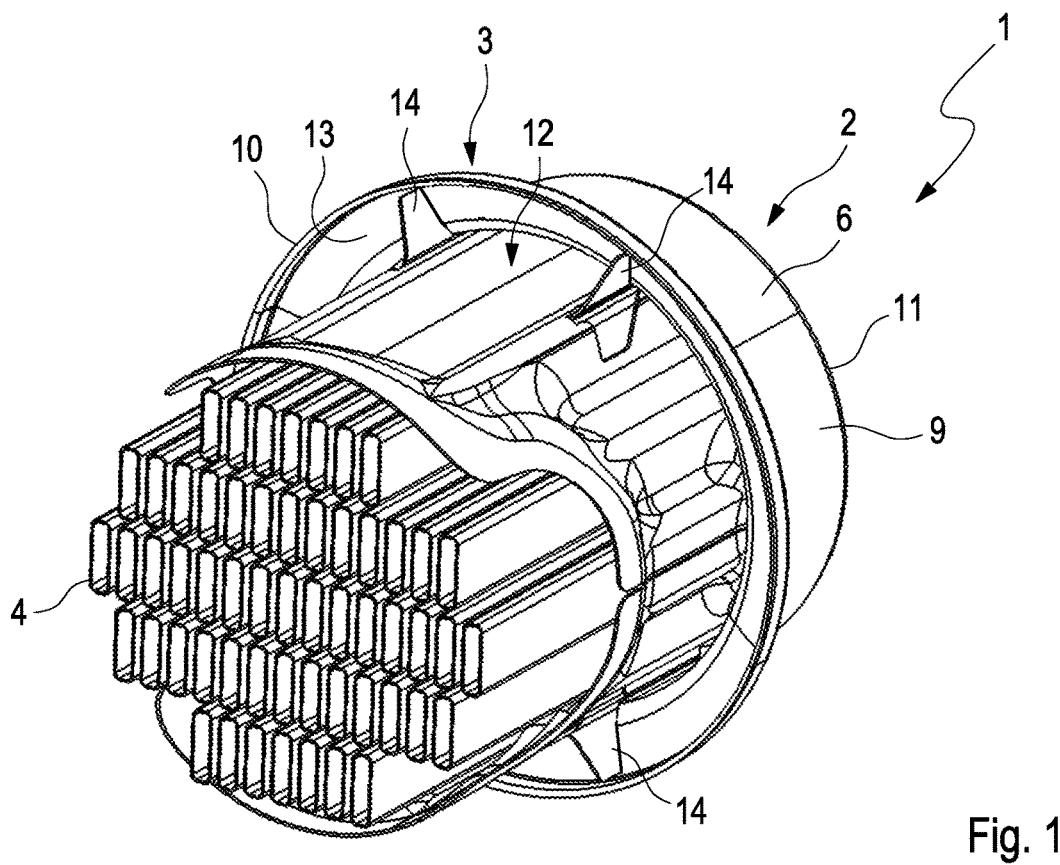
FIG. 1 a heat exchanger according to the invention, with heat exchanger tubes and with a separator, having two blades, arranged in the region of a second housing part, FIG. 2 an illustration as in FIG. 1, however with a separator, having two blades, arranged in the region of the first housing part, FIG. 3 a separator having two blades raised from the exterior inwards, FIG. 4 an illustration as in FIG. 4, however with only one single blade, FIG. 5 an illustration as in FIG. 4, however with blades of different heights, FIG. 6 an illustration as in FIG. 4, however with blades raised from the interior outwards, and with an injector opening, FIG. 7 an illustration as in FIG. 4, however with blades raised from the exterior inwards, and with two injector openings, FIG. 8 an illustration as in FIG. 7, however without an injector opening, but with a NACA opening instead.
Figure 2:
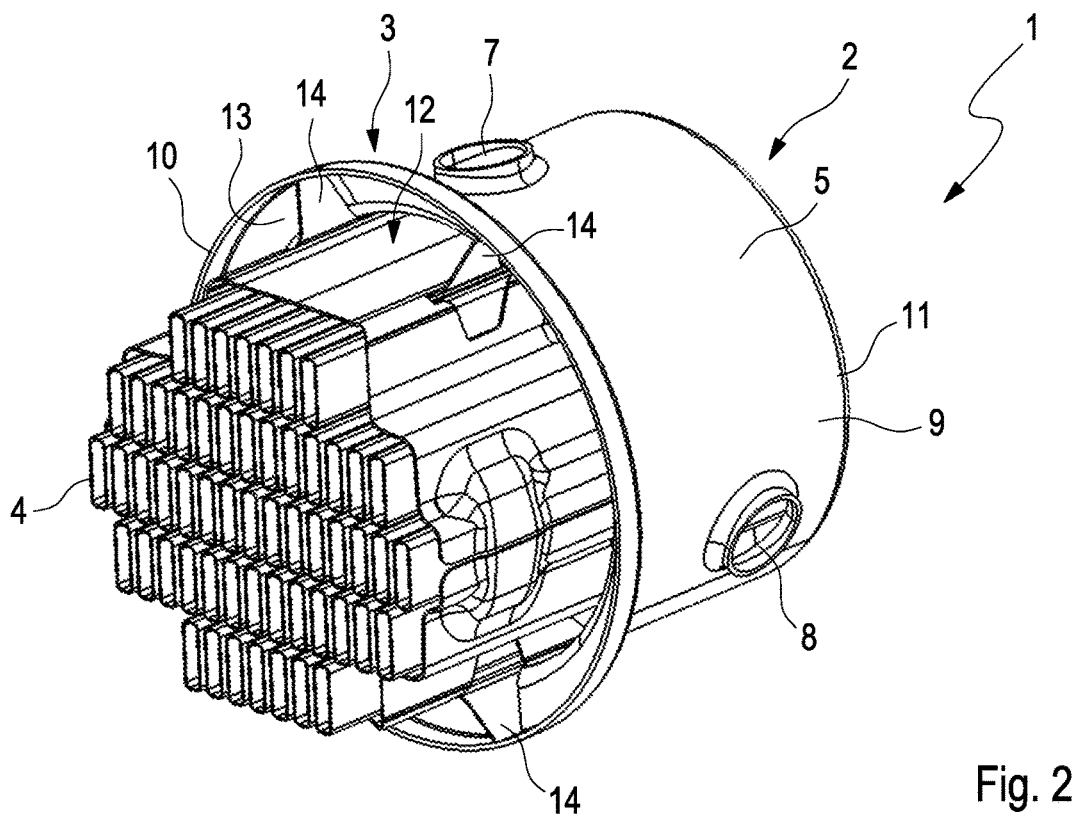

According to FIGS. 1 and 2, a heat exchanger 1 according to the invention, which can be configured for example as an exhaust gas heat exchanger, has a tubular housing 2, a flange ring 3 and two bases 11 and heat exchanger tubes 4, which run through the housing 2 and which are held respectively on the longitudinal end side in the bases 11. In the heat exchanger tubes 4, a first flow channel is formed here, and a second flow channel is formed between the heat exchanger tubes 4 and the housing 2. Of the housing 2, according to FIG. 2 only a first pot-shaped housing part 5, in particular produced in one piece by deep-drawing, is illustrated here, and according to FIG. 1 a likewise pot-shaped second housing part 6, in particular produced by deep-drawing, is illustrated. On the first housing part 5 according to FIG. 2, an inlet connecting-piece 7 and an outlet connecting-piece 8 are formed, via which coolant can arrive into the housing 2 and into the second flow channel, and can be directed out from the housing 2 again.

The housing 2 is therefore formed from the first housing part 5 and the second housing part 6, wherein each of these housing parts 5, 6 has a housing portion 9 and an outwardly widened flange ring portion 10 and a base 11. The two housing parts 5, 6 are connected to one another here via their two flange ring portions 10, for example are soldered, glued or welded to one another. For this, the two flange ring portions 10 are configured in a complementary manner to one another, so that for example the flange ring portion 10 of the first housing part 5 has an external diameter which is configured in a complementary manner to an internal diameter of the flange ring portion 10 of the second housing part 6, and via this the two housing parts 5, 6 can be inserted into one another via their flange ring portions 10. Furthermore, the two flange ring portions 10 delimit an annular space 13.

According to the invention, a separator 12 is now arranged between the housing 2 and the heat exchanger tubes 4 (cf. also FIGS. 3 to 8), wherein such separators 12 can be formed as favourably priced, shaped sheet metal stamped parts. On the at least one separator 12 according to FIGS. 1 and 2 in the respective housing parts 6, 5 respectively two separators 12 are arranged, on which respectively at least one blade 14 is provided, which engages at least partially into the previously described annular space 13 and prevents, at least reduces, preferably even rules out, a circumferential flow of coolant there, which in the most unfavourable case constitutes a short-circuit flow and prevents a sufficient and uniform through-flow of the heat exchanger 1. Observing here the individual blades 14 according to FIGS. 1 to 8, in the simplest case these are stamped out and bent in the respectively associated separator 12.

Figure 5:
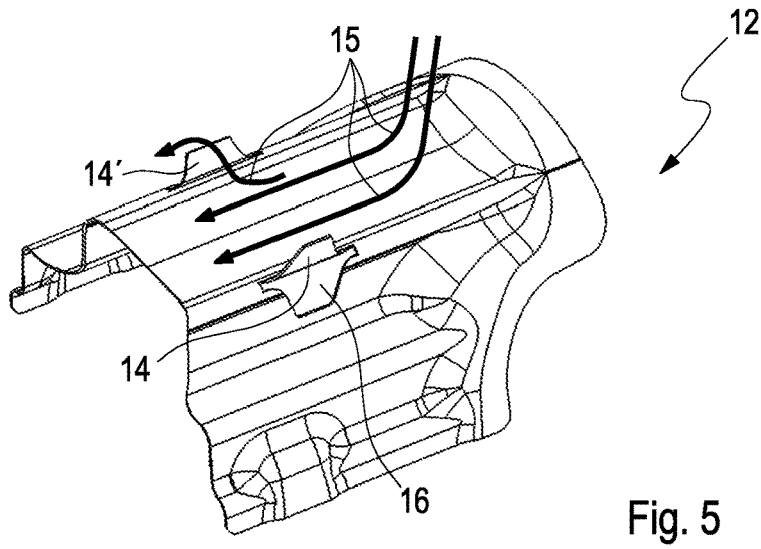
Figure 6:
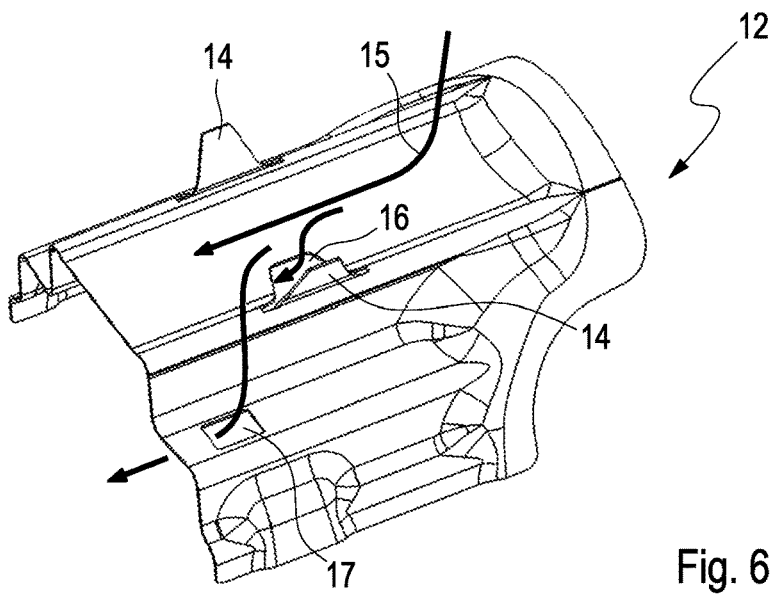

The blades 14 according to FIGS. 1 to 5 and 7 and 8 are bent here from the exterior inwards, whereas the blades 14 according to FIG. 6 are bent from the interior outwards. If, for example, the separator 12 according to FIG. 6 is used in the first housing part 5 according to FIG. 2, a flowing of a coolant flow 15 takes place from the first housing part 5 in the direction of the second housing part 6 along the separator 12, and at the same time a passing of the coolant flow 15 through openings 16, which have occurred by punching out of the blades 14. In the case of a blade 14 bent from the exterior inwards, the latter is arranged in front of the opening 16 in the direction of flow of the coolant flow 15.

Observing FIG. 1, it can be seen that an external geometry of the at least one blade 14 is configured in a complementary manner to an internal geometry of the annular space 13, and thereby the annular space 13 is virtually sealed in circumferential direction. In the same way, this also takes place by means of the blades 14 on the separator 12 according to FIG. 2. Observing the separator 12 according to FIG. 3, in this the coolant flow 15 is directed along the separator 12. With the separator 12 according to FIG. 4, only one blade 14 is provided, so that on the opposite side a flowing off by the coolant flow 15 in circumferential direction via the annular space 13 is made possible. The annular space 13 is illustrated here according to FIG. 4 only be a broken line, as the housing parts 5, 6 delimiting it are not illustrated.

Figure 3:
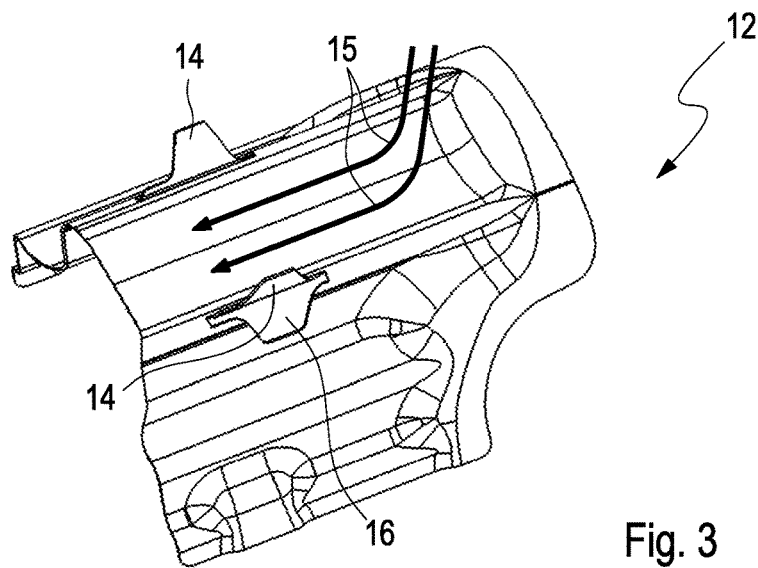
Figure 4:
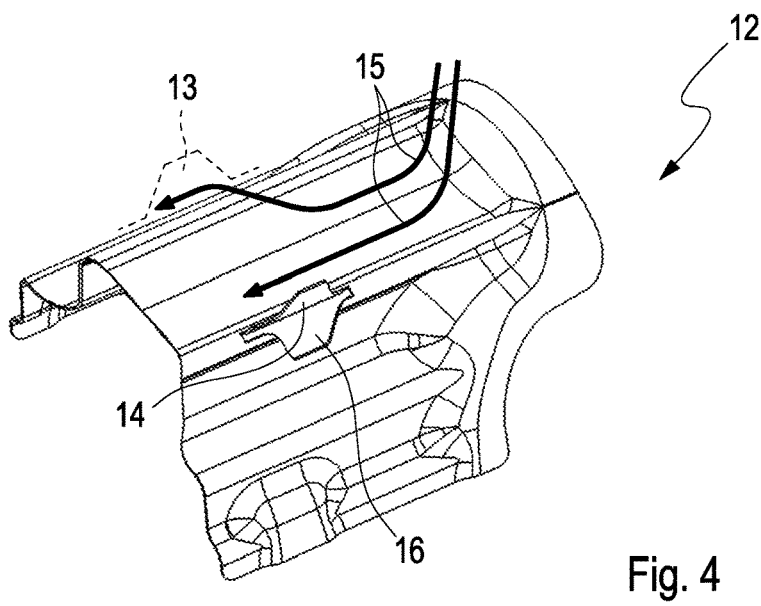

With the separators 12 according to FIGS. 1 to 3, the respective blades 14 have identical dimensions, in particular also an identical radial height, whereas the blade 14' of the separator 12 according to FIG. 5 has a smaller radial extent than the blade 14 and thereby likewise permits a precisely defined coolant flow 15 in circumferential direction in the annular space 13.

Figure 7:
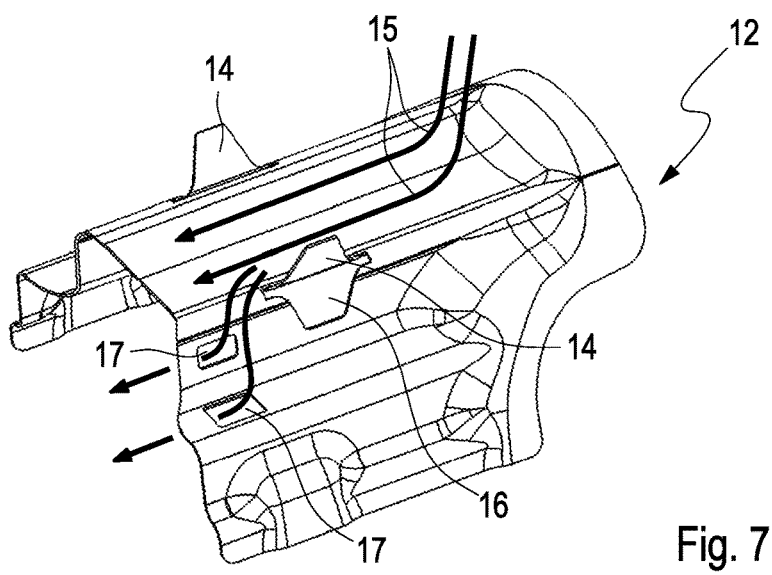
Figure 8:
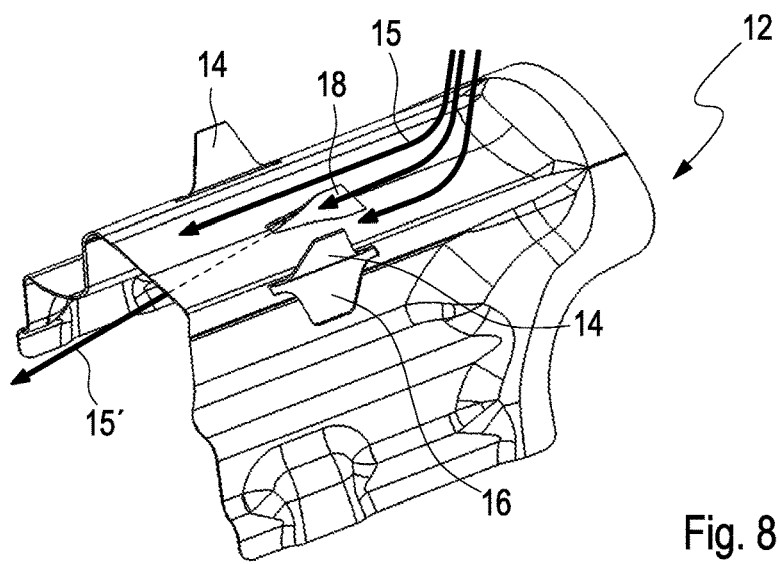

Observing the separator 12 according to FIG. 7, it can be seen that it has so-called injector openings 17, through which the coolant flow 15 can pass through the separator 12, just as through the openings 16. The separator 12 according to FIG. 8 has a so-called NACA opening 18, through which a coolant flow 15', directed in a targeted manner, is able to be achieved.

At least one separator 12 can either be securely connected here to the respectively associated housing part 5, 6, for example soldered, glued or welded, or else it can be clamped between the heat exchanger tubes 4 and the housing 2, wherein the at least one blade 14 in this case serves at the same time as a positioning contour for the aligning and positioning of the separator 12 in the housing 2. The housing parts 5, 6 themselves can be configured as favourably priced sheet metal stamped parts, which are produced in particular by deep-drawing.

As a whole, with the heat exchanger 1 according to the invention and with the at least one separator 12 according to the invention, inserted therein, an undesired short-circuit flow of the coolant flow 15 can be ruled out, whereby a uniform through-flow of the heat exchanger 1 can be achieved and, at the same time, the risk of boiling regions can be at least reduced.

The invention claimed is:

1. A heat exchanger comprising:
    a tubular housing;
    a flange ring;
    two bases; and
    heat exchanger tubes, which run through the housing and are respectively held at a longitudinal end side in the bases, wherein in the heat exchanger tubes, a first flow channel is formed, and a second flow channel is formed between the heat exchanger tubes and the housing;
    wherein the housing is formed from a first housing part and a second housing part each being pot-shaped and having a housing portion, an outwardly widened flange ring portion, and a base, and wherein the first and second housing parts are connected to one another via the flange ring portions, wherein the flange ring portions delimit an annular space;
    wherein on the first housing part, an inlet connecting-piece and an outlet connecting-piece for coolant are provided;
    wherein between the housing and the heat exchanger tubes, at least one separator is arranged, on which at least one blade is provided and in which at least one opening adjacent the at least one blade is provided, the at least one blade engages at least partly into the annular space and at least reduces a circumferential flow therein; and
    wherein an external geometry of the at least one blade is configured in a complementary manner to an internal geometry of the annular space, the annular space extending between an outer peripheral edge of the flange ring portions and an outer surface of the separator.

2. The heat exchanger according to claim 1, wherein the at least one blade is stamped out from the separator and shaped to form the opening adjacent thereto.

3. The heat exchanger according to claim 2, wherein at least one of:
    the at least one separator has at least one injector opening; and
    the at least one separator has at least one NACA (National Advisory Committee for Aeronautics) opening.

4. The heat exchanger according to claim 2, wherein the at least one blade includes at least two blades having identical radial heights or having different radial heights.

5. The heat exchanger according to claim 2, wherein one of:
    the at least one separator is securely connected to at least one of the first housing part and the second housing part; or the at least one blade serves as positioning contour for aligning and positioning the at least one separator in the housing.

6. The heat exchanger according to claim 2, wherein the first and second housing parts are soldered, welded or joined to one another on the flange ring portions.

7. The heat exchanger according to claim 1, wherein at least one of:
the at least one separator has at least one injector opening; and
the at least one separator has at least one NACA (National Advisory Committee for Aeronautics) opening.

8. The heat exchanger according to claim 1, wherein the at least one blade includes at least two blades having identical radial heights.

9. The heat exchanger according to claim 1, wherein one of:
the at least one separator is securely connected to at least one of the first housing part and the second housing part; or
the at least one blade serves as positioning contour for aligning and positioning the at least one separator in the housing.

10. The heat exchanger according to claim 1, wherein the first and second housing parts are soldered, welded or joined to one another on the flange ring portions.

11. The heat exchanger according to claim 1, wherein the heat exchanger is configured as an exhaust gas heat exchanger.

12. The heat exchanger according to claim 1, wherein at least one of the first and second housing parts is configured as a one-piece, shaped, sheet-metal stamped part.

13. The heat exchanger according to claim 12, wherein the at least one of the first and second housing parts is produced by deep-drawing.

14. The heat exchanger according to claim 1, wherein the at least one blade includes at least two blades having different radial heights.

15. The heat exchanger according to claim 1, wherein the at least one blade and the corresponding adjacent opening have substantially the same shape.

16. The heat exchanger according to claim 1, wherein the at least one blade is bent circumferentially outward from the respective separator such that the corresponding adjacent opening is positioned circumferentially inward to the at least one blade.

17. The heat exchanger according to claim 1, wherein the at least one blade is folded circumferentially inward from the respective separator such that the corresponding adjacent opening is positioned circumferentially outward to the at least one blade.

18. A heat exchanger comprising:
a tubular housing formed from a first housing part and a second housing part each being pot-shaped and having a housing portion, an outwardly widened flange ring portion, and a base, the first and second housing parts being connected to one another via the flange ring portions, wherein the flange ring portions delimit an annular space;
an inlet connecting-piece and an outlet connecting-piece for coolant on the first housing part;
a flange ring formed from the flange ring portions;
heat exchanger tubes, which run through the housing and are respectively held at a longitudinal end side in the base of each housing part, wherein in the heat exchanger tubes, a first flow channel is formed, and a second flow channel is formed between the heat exchanger tubes and the housing; and
at least one separator arranged between the housing and the heat exchanger tubes, at least two blades being provided on the at least one separator, each blade having an opening adjacent thereto, each blade engaging at least partly into the annular space and at least reducing a circumferential flow therein;
wherein an external geometry of the at least two blades is configured in a complementary manner to an internal geometry of the annular space;
wherein the least two blades have identical radial heights or differing radial heights; and
wherein an external geometry of the at least one blade is configured in a complementary manner to an internal geometry of the annular space, the annular space extending between an outer peripheral edge of the flange ring portions and an outer surface of the separator.

* * * * *